United States Patent [19]

Stoll

[11] Patent Number: 4,560,894
[45] Date of Patent: Dec. 24, 1985

[54] ELECTRIC LINEAR DRIVE WITH AN EXTERNAL ROTOR ELECTRIC MOTOR

[76] Inventor: Kurt Stoll, D-7300, Esslingen, Fed. Rep. of Germany

[21] Appl. No.: 624,601

[22] Filed: Jun. 26, 1984

[30] Foreign Application Priority Data

Jul. 16, 1983 [DE] Fed. Rep. of Germany ....... 3325801

[51] Int. Cl.⁴ .............................................. H02K 7/00
[52] U.S. Cl. .................................. 310/67 R; 310/266; 310/80
[58] Field of Search ...................... 310/266, 80, 83, 67

[56] References Cited

U.S. PATENT DOCUMENTS 4,438,360 3/1984 Held ................................ 310/266 X Primary Examiner—Donovan F. Duggan
Attorney, Agent, or Firm—McGlew and Tuttle

[57] ABSTRACT

An electric linear drive comprises a housing in which an external rotor electric motor is mounted. The motor has its stator fixedly mounted on said housing while on the other hand the rotor of the motor has a male screw thread thereon on which a bush is screwed. The bush is joined to a thrust rod and there are means for guiding the bush axially in the housing so that it may be moved into and out of the housing with a telescoping effect. This guiding means is furthermore designed for limiting the axial stroke of the thrust rod.

11 Claims, 1 Drawing Figure

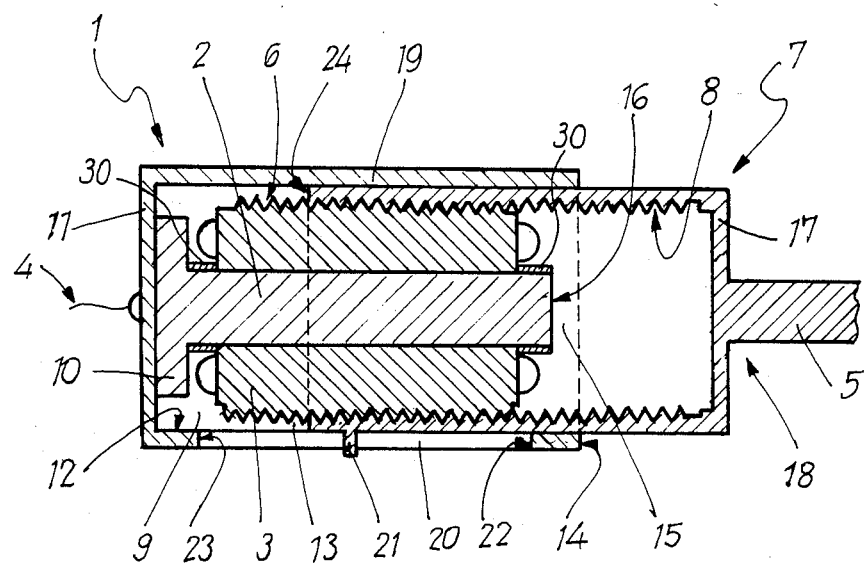

ELECTRIC LINEAR DRIVE WITH AN EXTERNAL ROTOR ELECTRIC MOTOR

BACKGROUND OF THE INVENTION

The present invention relates to electric linear drives.

Known electric linear drives have so far been designed round the use of electric motors, whose rotor is placed inside the stator. They suffer from the drawback that the transmission, needed for converting the rotary motion of the motor into a linear motion, is complex and expensive. Such a transmission tends to be large in size and requires a sizeable number of precision guiding and bearing elements so that a considerable amount of labor and material goes into its production. The price of known linear drives is correspondingly high. Moreover, internal rotor motors as so far used are inferior to external rotor motors in respect of a whole number of relevant electrical and mechanical characteristics.

SHORT OUTLINE OF THE PRESENT INVENTION

One purpose of the present invention is to design linear drives free of these shortcomings of the prior art.

A still further purpose or object is to create an electric linear drive that is simpler in design than known linear drives.

As a further object, the invention is intended to make possible such a drive that is compacter than known drives and may be manufactured at a lower price.

In keeping with a further aim of the invention, the new linear drive is to keep the benefits of external rotor electric motors even though they are put to new uses.

For effecting these and further purposes, the novel electric linear drive has a housing with the electric external rotor motor therein and joined to the stator of the motor, the rotor of the motor having a screw threaded part thereon. There is furthermore a thrust rod that is screwed on the rotor by means of a bush having a female thread and means for keeping it from rotating in the housing, when moving in relation thereto.

It will be seen from this that the electric linear drive of the invention uses an electric motor whose external rotor rotating around the stator has a screw thread cooperating with a mating thread on the thrust rod for conversion of the rotation of the external rotor into an axial translation of the thrust rod. It is more or less true to say that the external rotor forms a threaded rod for the rotary-translatory transmission, something that would not be possible with a motor having an internal rotor. Unlike conventional transmissions, the transmission of the present invention makes it unnecessary to have a driving wheel joined to the electric motor. This makes possible a certain economy in the use of material. On the other hand it is readily possible for the design to be changed so that the outer face of the external rotor has an external screw thread; then the linear drive of the present invention may be manufactured simply and cheaply. As a consequence of the use of the external rotor as a threaded "rod" or threaded driving element, the linear drive of the invention is distinguished by its having small overall dimensions. A further point to be noted is that the rotor of a conventional external rotor motor is more or less fixed in the axial direction in relation to the stator, or will at any rate only be able to be moved with a very small degree of axial play. This property of this motor design is more specially useful when, as part of the invention, the external rotor is made in the form of a male-threaded member that is axially fixed; the normally used form of bearing on the stator means that the rotor is precisely fixed in the axial direction and in many cases it is strong enough to withstand the forces produced by the linear drive without any reinforcing or stiffening means.

In keeping with one further development of the invention, the external rotor motor is placed centrally and axially in a cylindrical opening so that the rotor runs with a space between it and the inner wall face, limiting the opening in the housing, and the bush of the thrust rod is taken up with a close fit between the rotor and the inner wall face. This design gives the useful effect that while being very simple in structure it still makes possible a precise and firm guidance of the thrust rod in the housing.

The bush may be so placed that it is flush with the housing when the linear motor is in the retracted position. This in turn means that, in the retracted position of the thrust rod, the unit has the smallest possible overall size and furthermore its housing shell, placed round the external rotor motor, is smooth and regular on all sides. This gives the greatest possible safeguard for the motor so that it is not damaged by blows or other effects. Furthermore such a smooth and regular shell makes it possible to see quickly if the thrust rod is in the retracted position. Last but not least, there is the useful effect of a neat and high quality industrial design.

It is furthermore possible for the housing to be in the form of a cylindrical casing that is closed at one end, in and out of which the bush may be telescoped, the bush, when retracted, being withdrawn into the hollow or pocket formed inside the housing. With this form of the invention, the housing is placed around the external rotor motor and the thrust rod bush with the least possible clearance. When designed in this way, the unit is highly compact and specially well suited for applications or uses where space is at a premium.

It is possible to have a guiding structure, functioning as a key to stop twisting, formed in an axial direction on the housing or on the bush, such guide structure cooperating with a complementary part of the other part in the manner of a key and groove. This structure is simple to manufacture and may be readily adapted to be in line with the requirements. The anti-twist guiding structure may furthermore be designed to function as a stop for limiting the motion of the stroke of the linear drive. This twin function of the guide structure involves a specially simple design that is economical to produce.

Further useful effects and details of the invention will be seen from the account now to be given of one working example of the invention to be seen in the single FIGURE herein.

DETAILED ACCOUNT OF WORKING EXAMPLE OF THE INVENTION

The linear drive to be seen in this FIGURE has a housing 1, in which an external rotor electric motor is placed. The stator 2 of this motor is fixedly joined to the housing 1 and the rotor 3 of the motor is bearinged or journaled at 30 on the outer face of the stator 2. The rotor 3 is the driven part of the motor. If the external motor is supplied with electrical power by way of a terminal 4, the rotor 3 will be caused to turn about the stator 2, the same then acting as a stationary axle or journal. In the linear drive of the present invention the external rotor electric motor is preferably one designed to run at a low speed. Furthermore the rotor 3 should be easy to reverse and after running in reverse, be caused to turn in the forward direction again so that the thrust rod 5 may be reciprocated. External rotor motors keeping to this condition are known in the prior art and are used on a wide scale. For this reason the FIGURE does not give any details of the design of such a motor.

In keeping with the invention the rotor 3 of the external rotor motor has a male screw thread 6. Such thread may for example be cut into the face the rotor 3 of a standard external rotor electric motor. However, it is also possible for the rotor to be made up of laminations that are so stamped with teeth that when stacked together the rotor has a helical groove therein as the screw thread. In the case of a squirrel cage rotor with conductors in outwardly open slots, the male screw thread may be cut in the conductors as well. It is not absolutely essential that the screw thread be continuous from end to end and it may be made up of a number of segments. With a rotor 3 whose outline is not truly circular, it is only necessary for the screw thread to be cut in the projecting parts of the rotor 3 with gaps in the thread therebetween. In such a case all that is required is for the thread to be long enough to make certain of a full guiding function for the female thread on the thrust rod.

In place of a male or external thread on the outer face of the rotor 3 it is furthermore possible to have a guide worm, having an equivalent function, running helically around the rotor 3. Such a guide worm may furthermore be segmented if this is desired. It is important for the invention that the rotor 3 be so designed or developed that it function as a threaded rod, by way of which its rotary motion may be converted into an axial thrust motion of the thrust rod. The thrust rod 5 is for this purpose rigidly joined to a cylindrical bush or bushing 7, that has a female thread 8 within it. The bush may be then screwed onto the male thread 6 of the rotor 3. Whereas it is able to be axially slid in translation, it is guided in the housing 1 so that it may not rotate in relation to it. On the other hand the rotor 3 is axially fixed on the stator 2 so as to be kept from moving axially relative thereto, as is regularly the case with standard external rotor electric motors. This being so, any rotation of the rotor 3 causes axial motion of the bush 7 (through the engaged threads 6,8) and for this reason of the thrust rod 5. The female thread 8 to be seen in the FIGURE may be, it will be clear, replaced by other guide elements, that have a helical form such that they may cooperate with the outer shape of the rotor 3 functioning as a threaded rod or lead screw. If for example the rotor 3 has a worm thread on its outer face, the bush 7 of the thrust rod 5 may be furnished with a number of nosepieces that are out of line with each other in the circumferential direction describing a guide helix. The thrust forces are taken up by the bearing of the rotor 3 on the stator. In many applications the bearing design as regularly used in standard external rotor electric motors will be sufficient for this purpose; in case of need however, the bearings may be reinforced for use in a linear drive in keeping with the invention. Reversal of the direction of the rotor 3 will, as may be clearly seen, cause a reversal of the linear direction of motion of the thrust rod 5. The same may then be moved into and out of the housing 1 in axial translation.

As regards details of the design, it will be seen that the external rotor electric motor is mounted centrally and axially in a cylindrical opening 9 in the housing. In this respect the stator 2 is fixed by way of a base 10 on the floor 11 of the opening 9 in the housing with the axial center of the opening 9 in it. The rotor 3 is concentrically bearinged at 30 on the stator 2 and is so placed in the opening 9 that it is spaced from the open end thereof. Its outer face is spaced from the inner face 12 forming the limit of the opening 9 of the housing. In the space 13 between the rotor 3 and inner face 12 the bush 7 of the thrust rod 5 is placed. This bush 7 is of such a size that it fits exactly into the space 13 and it is guided on the inner face 12 when it is moving in translation. This form of guiding action makes certain that no tilting moments are transmitted to the external rotor electric motor, which are the consequence of transverse forces acting on the thrust rod 5. Such tilting or rocking moments would otherwise be likely to cause the external rotor electric motor to run irregularly.

Furthermore the guidance of the bush 7 on the inner face 12 of the opening 9 in the housing 9 stops the thrust rod from being tilted. In the pulled-in position of the thrust rod 5 the length along which a guiding action is produced on the inner face 12, is clearly greatest; the housing 1 and the bush 7 are however so dimensioned that in the drawn-in condition as well of the thrust rod 5 there is a long enough guiding action on the inner face 12 of the opening. To this end it is more specially possible for the external rotor electric motor to be placed within the housing 1 so as to be to the left of the right hand end 14 of the housing 1. The section 15 of the inner face 12 between the top edge 16 of the external rotor electric motor and the end 14 means that the bush 7 is firmly kept in position, even when its female thread 8 has got as far as the end of the outer male thread 6 on the rotor 3.

In the present working example of the invention the bush 7 has the form of a cup or bell and is composed of a pipe-like body with the female thread 8 therein and which, when actuated by the rotor 3, may be moved to and fro in the opening 9 in the housing. At its end furthest from the external rotor electric motor the bush 7 has an end plate 17 with its middle part joined to the thrust rod 5. The thrust rod has a smaller diameter than the bush 7 so that there is a radial face 18 on the plate 17 running from the outer face of the bush 7 to the outer face of the thrust rod 5. This design is however in no way essential and the thrust rod may be adapted to the other parts of the linear drive quite freely. The thrust rod does not necessarily have to have a round cross section and might for example be in the form of a strut or beam. It would also be possible for the bush to have a simple eye therein. If the thrust rod is, as here, made in the form of a tube with a sufficiently large diameter, the inner or female thread may be cut in the inner face of such tube. If, in the case of a further development of the invention, the thrust rod 5 is made of solid round stock with the right diameter, the female screw thread 8 may be in a central blind hole in one end thereof.

The axial length of the bush 7 and the depth of the opening 9 in the housing are so matched to each other in the working example to be seen in the FIGURE that the bush 7 is flush with the housing when it has been retracted. Because of this, the distance the bush 7 projects from the housing 1 will in all cases be equal to the degree to which the thrust rod 5 has been moved out so that one may readily see at a glance how far it is moved out. Furthermore in the pulled-in position of the bush 7, that will generally be the inoperative position of the system, the bush will be well safeguarded against damage from outside, the external rotor electric motor being within two casings and well safeguarded against tipping moments acting on the thrust rod 5. A further effect of having the bush 7 tucked into the rest of the structure is that the unit is given a neater appearance.

In the present working example the housing 1 has the form of a cylindrical sleeve body 19. The end plate 11 shutting off one end of the body has a round outline and is at the opposite end of the linear drive to the end plate 17 of the bush 7. The bush 7 is telescoped into the sleeve body 19 when the drive is retracted and may be telescoped in and out of the sleeve body 19 by the motor. The sleeve-like housing 1 is for this reason made with generally the same shape as the bush 7, but however it is only thicker than this by the necessary greater thickness of the material of which it is made and this makes certain that the overall size of the linear drive is kept down to a minimum.

To keep the bush 7 from twisting in the housing 1 it is possible for a guide structure running in the length direction to be present on the housing 1 or on the bush 7, and for there to be a mating counterpart on the other one thereof for fitting into the guiding structure so that one has a peg and groove arrangement for ensuring axial motion without twisting. In the instant working example this guide structure is in the form of a lengthways slot 20 in the housing 1 to take up a pin 21 mounted on the bush 7. The pin 21 may for example be screwed into the sleeve body of the bush 7 from the outside. In place of a pin 21 it would naturally enough be possible to have a nosepiece or mound of some sort and in place of a lengthways slot running right through the sleeve body 19 it would be possible to have a lengthways groove cut into the inner face of the sleeve body, although this is not marked in the FIGURE. This sort of design is beneficial because the external rotor electric motor would always be taken up in a sealed housing shell and well safeguarded against blows or the effects of dirt and the like. On the other hand a lengthways slot 20 is likely to increase the rate of removal of heat generated by the motor. The guiding elements used in the teaching of the invention with the effect of a groove and peg, on the housing 1 and the bush 7, will be seen to be able to be exchanged so that, more specially, it would be possible to have a lengthways groove in the bush 7 and for the housing 1 to have a guide screw running through it.

In many applications of the linear drive of the invention it is necessary to have a stop for limiting motion of the thrust rod 5. One specially good way of doing this is to design the anti-twist guiding structure in the form of a stop as well for limiting the translatory motion of the thrust rod 5. In the present working example of the invention the axial length of the lengthways slot 20 is roughly the same as the linear stroke of the thrust rod 5 and the pin 21 comes up against one end 22 of the lengthways slot 20 when the thrust rod 5 is moved outwards. In this stopped or checked position the thrust rod 5 is moved outwards as far as it will go. On the same lines it is possible for the depth of motion of the thrust rod 5 into the housing 1 to be limited by the pin 21 running up against the other end 23 of the lengthways slot 20. In keeping with the FIGURE it is however furthermore possible for the bush 7 to be allowed to move so far that its front edge 24 runs against the end plate 11 of the housing 1. In this position the pin 21 will be a small distance short of the axial end 23 of the lengthways slot 20. The combined guiding and stopping structure in keeping with the present invention is very simple in design and economic to produce. Furthermore, to make possible simple variation of the length of the linear stroke, it is possible to have a number of lengthways slots 20, lengthways grooves or lengthways slots with different lengths and in different positions on the housing 1 or the bush 7. The mechanical stop may furthermore have its place taken by a limit switch or switches, that halt the external rotor electric motor or reverse it and keep the motor winding from being overloaded.

I claim:

1. An electric linear drive comprising:
   a housing;
   a stator fixed to said housing and extending in said housing;
   an external rotor mounted for rotation around said stator and axially fixed with respect to said stator, said rotor having a male thread defined on an external surface thereof;
   a bush axially movable and rotationally fixed with respect to said housing, said bush having an interior space with a female thread defined thereon, said female thread engaged with said male thread so that rotation of said rotor causes linear axial motion of said bush; and
   a thrust rod connected to said bush for movement in an axial direction with axial movement of said bush.

2. The linear drive as claimed in claim 1 wherein said external rotor electric motor is mounted centrally in a cylindrical opening in said housing alined with an axis thereof, said rotor being spaced from an inner wall face forming the outer limit of said opening, said bush being joined to said thrust rod and fitting between said rotor and said inner wall face.

3. The linear drive as claimed in claim 1 wherein said bush is adapted to be taken up completely in said housing in a retracted position thereof, said bush then ending flush with an end face of said housing.

4. The linear drive as claimed in claim 1 wherein said housing is made up of a cylindrical sleeve and an end plate shutting same off at one end and said bush may be telescoped into and out of said housing within an open end of said housing and when said bush is completely withdrawn into said housing it is at some distance from said open end of said housing.

5. The linear drive as claimed in claim 1 comprising a guiding structure and a complementary counterpart for cooperation therewith in limiting relative motion between same to translation only, said guide structure and said counterpart forming a connection between said bush and said housing.

6. The linear drive as claimed in claim 5 wherein said guiding structure is in the form of a lengthways groove and said counterpart is in the form of a peg fitting in said groove.

7. The linear drive as claimed in claim 6 wherein said groove is in the form of a slot.

8. The linear drive as claimed in claim 1 comprising stop means for limiting motion of said thrust rod.

9. The linear drive as claimed in claim 6 comprising stop means for limiting motion of said thrust rod, said stop means forming part of said guide structure and limiting the linear motion of said thrust rod.

10. The linear drive as claimed in claim 9 wherein said slot has an axial length generally equal to maximum linear motion of said thrust rod, said counterpart acting as a stop when at one end of said slot.

11. The linear drive as claimed in claim 7 wherein said bush of said thrust rod is adapted to strike against a plate forming part of said housing and placed at an end thereof.

* * * * *